United States Patent [19]

Saito et al.

[11] Patent Number: 5,668,648

[45] Date of Patent: *Sep. 16, 1997

[54] COMPUTER-ASSISTED HOLOGRAPHIC DISPLAY APPARATUS

[75] Inventors: Tutomu Saito, Yokohama; Toshikazu Matsui, Kobe, both of Japan

[73] Assignee: Kabushiki Kaisha Toshiba, Kawasaki, Japan

[*] Notice: The term of this patent shall not extend beyond the expiration date of Pat. No. 5,347,375.

[21] Appl. No.: 261,709

[22] Filed: Jun. 17, 1994

Related U.S. Application Data

[63] Continuation-in-part of Ser. No. 981,296, Nov. 25, 1992, Pat. No. 5,347,375.

[30] Foreign Application Priority Data

Nov. 26, 1991 [JP] Japan ................................ 3-336137
Nov. 26, 1991 [JP] Japan ................................ 3-336138

[51] Int. Cl.$^6$ ............................ G03H 1/08; G03H 1/04
[52] U.S. Cl. .......................... 359/9; 359/900; 364/525
[58] Field of Search .................... 359/9, 900; 364/525; 382/280, 299, 300

[56] References Cited

U.S. PATENT DOCUMENTS

| 3,606,518 | 9/1971 | Metherell | 359/9 |
|---|---|---|---|
| 3,680,041 | 7/1972 | Smith, Jr. | 359/9 |
| 4,109,996 | 8/1978 | Ersoy | 359/900 |
| 4,562,540 | 12/1985 | Devaney | 364/400 |
| 4,602,257 | 7/1986 | Grisham | 342/25 |
| 4,701,006 | 10/1987 | Perlmutter | 359/900 |
| 4,716,414 | 12/1987 | Luttrell et al. | 342/179 |
| 4,778,262 | 10/1988 | Haines | 359/9 |
| 4,838,644 | 6/1989 | Ochoa et al. | 359/561 |
| 4,969,700 | 11/1990 | Haines | 359/29 |
| 5,079,697 | 1/1992 | Chesler | 364/413.2 |
| 5,119,214 | 6/1992 | Nishii et al. | 359/9 |
| 5,194,971 | 3/1993 | Haines | 359/9 |
| 5,237,433 | 8/1993 | Haines et al. | 359/9 |
| 5,297,219 | 3/1994 | Weldy | 382/54 |
| 5,475,511 | 12/1995 | Haines et al. | 359/9 |
| 5,497,254 | 3/1996 | Amako et al. | 359/53 |

FOREIGN PATENT DOCUMENTS

| 0193177 | 8/1986 | Japan | 359/9 |
|---|---|---|---|
| 1169480 | 7/1989 | Japan | G03H 1/08 |

OTHER PUBLICATIONS

Stephen A. Benton, "Experiments in Holographic Imaging" SPIE Institute Series, vol. IS 8 (1990) pp. 247–267.
G. F. Schils, et al., "Iterative Technique for the Synthesis of Optical–Correlation Filters", J. Opt. Soc. Am. A, vol. 3, No. 9, Sep. 1986, pp. 1433–1442.
G.F. Schils, et al., "Rotationally Invariant Correlation Filtering", J. Opt. Soc. Am. A, vol. 2, No. 9, Sep. 1985, pp. 1411–1418.

*Primary Examiner*—Paul M. Dzierzynski
*Assistant Examiner*—John Juba, Jr.
*Attorney, Agent, or Firm*—Oblon, Spivak, McClelland, Maier & Neustadt, P.C.

[57] ABSTRACT

A computer-assisted holographic-display apparatus comprises a diffraction image generator which receives an input image signal representing an object and computes corresponding diffraction pattern with a first sampling density. An interpolation processor is connected to the diffraction image generator via an intermediate page memory. The interpolation processor subjects the diffraction pattern to the interpolation process to create an interpolated diffraction pattern with an increased second sampling density. An interference pattern generator is connected to the interpolation processor to compute an interference caused pattern between the interpolated diffraction pattern and a reference wave by converting amplitude and phase distributions of the input image signal into the intensity distribution. The interference pattern is displayed on a previously selected displaying device.

16 Claims, 10 Drawing Sheets

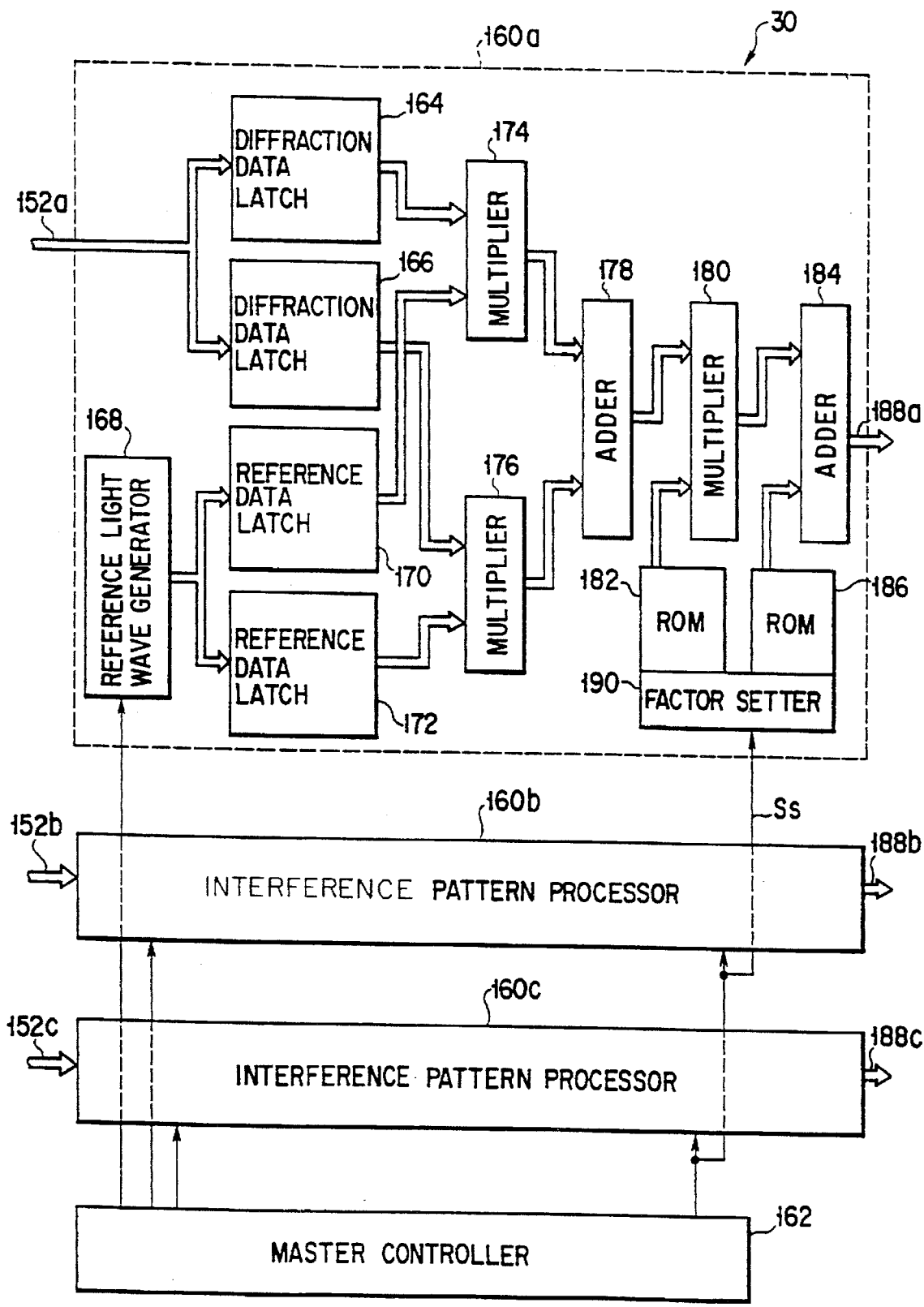
F I G. 8

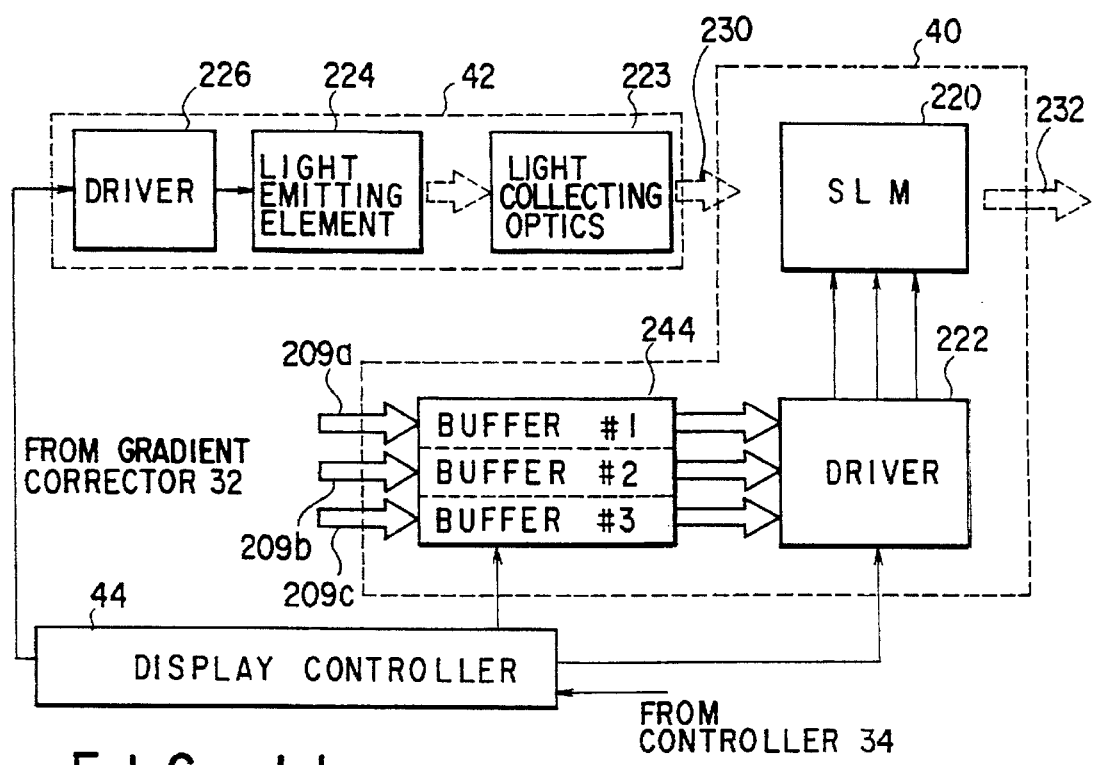
F I G. 11
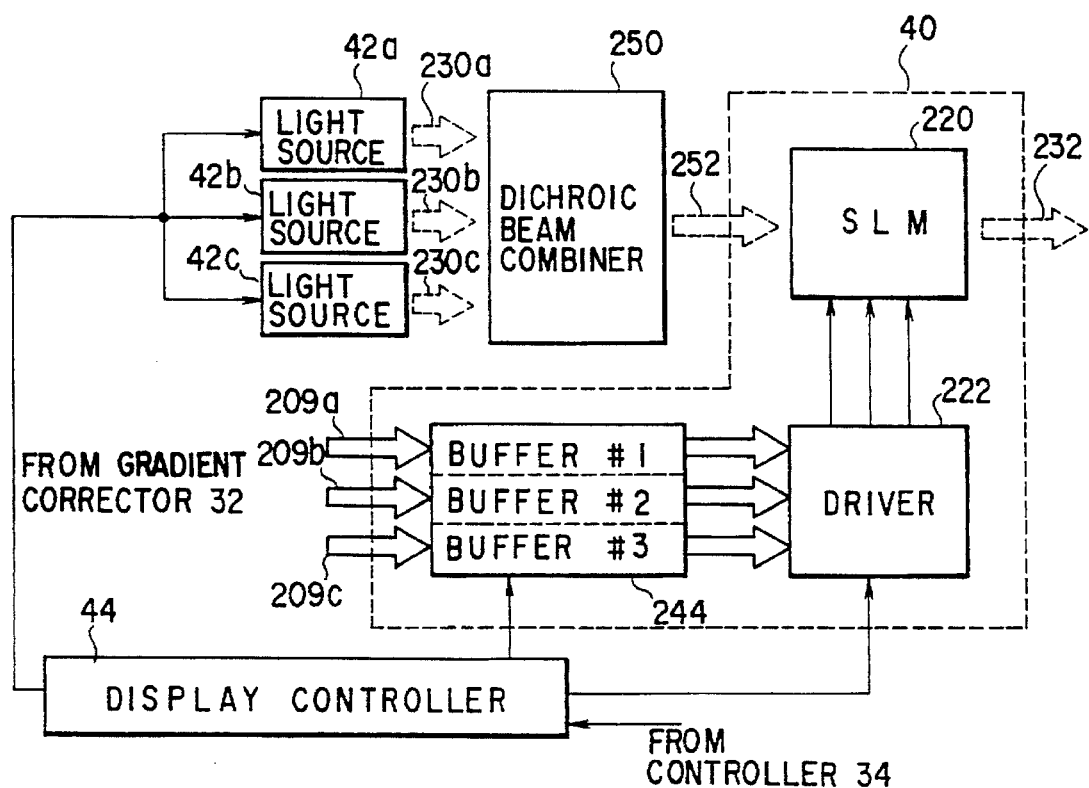
F I G. 12

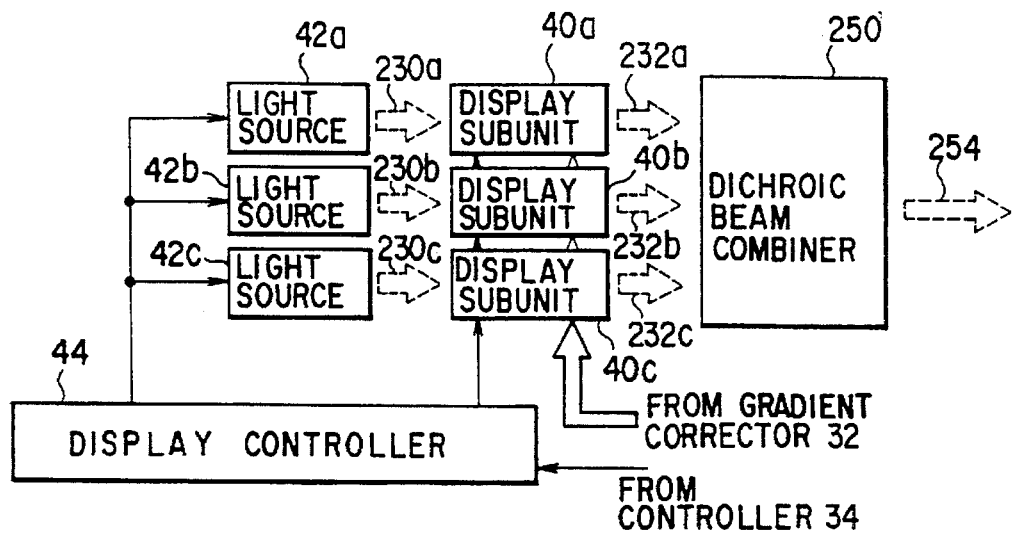
F I G. 13
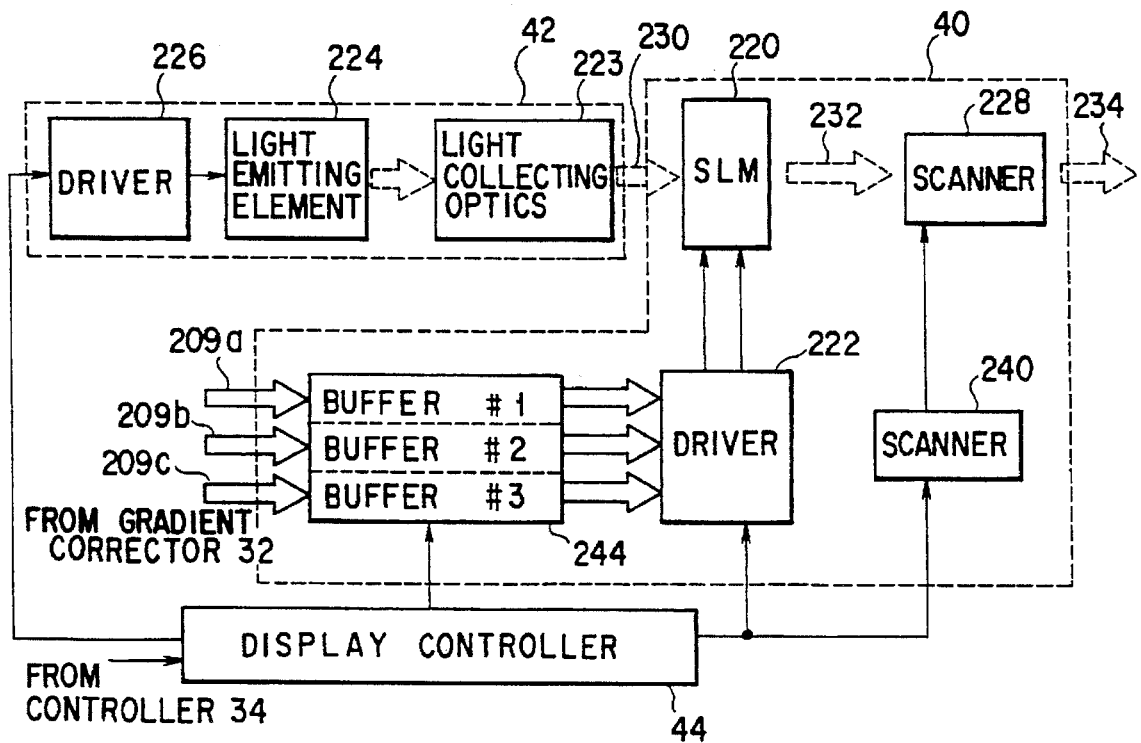
F I G. 14

COMPUTER-ASSISTED HOLOGRAPHIC DISPLAY APPARATUS

CROSS-REFERENCES TO THE RELATED APPLICATIONS

This application is a continuation-in-part of U.S. patent application Ser. No. 07/981,296 filed, on Nov. 25, 1992 now U.S. Pat. No. 5,347,375.

BACKGROUND OF THE INVENTION

1. Field of the Invention

The present invention relates to a holographic-display apparatus, and more particularly to an apparatus for forming holographic three-dimensional (3-D) optical images corresponding to input object image information. Further, the present invention specifically relates to a computer-assisted holographic display system for calculating wave front (diffraction image) data obtained on the hologram plane based on sampling data of a 3-D object, calculating interference pattern data between the calculated diffraction pattern data and reference light data, and forming an interference pattern corresponding to the interference pattern data on a spatial light modulator such as a liquid crystal spatial light modulator. Further, the present invention specifically relates to a computer assisted holographic-display system for calculating wave front (diffraction image) data obtained on the hologram plane based on sampling data of a 3-D object, and forming a phase-modulation pattern corresponding to the calculated wave front data on a spatial light modulator such as a liquid crystal spatial light modulator.

2. Description of the Related Art

The computer holography is a technique for forming an optical image of a 3-D object on a plane medium (which is normally called "holographic plate") with the assistance of a highly advanced computer. With the recent development of the digital equipment, the computer hologram technique becomes increasingly important in the application field of 3-D image data process, measurement and display thereof, for example.

Unlike the existing purely optical hologram devices, the computer-hologram apparatus produces by computation a holographic image pattern to record a resultant computer-generated holographic image on a recording medium of selected type. Since the computer can create any desired 3-D object images including imaginary graphic images, the computer hologram is excellent in flexibility and wide in applicability for the industrial use. The presently available computer hologram apparatus, however, suffers from the fact that the efficiency of computation remains low. An increased amount of repetitive computations should be required to produce a computer hologram. The necessity of such repetitive computations forces the total processing time to increase, which necessitates the use of a large-scale computer system. This reduces the production efficiency of 3-D object hologram which is required to be recorded to maintain the high quality of a reproduced image.

Until today, several techniques have been proposed for reducing in amount the image information to be processed, thereby to attain an increased computation efficiency in the art of computer hologram. One of the techniques may be found in what is called the "Lohmann type" computer hologram apparatus as is well known among those skilled in the art. This computer hologram apparatus generates a hologram by computing the diffraction pattern of an object. The computation algorithm is described, for example, in "Precision Machine", Vol. 47, No. 12, Supplement, (Dec. 6, 1981) at pp. 101–105, wherein a computer-generated hologram is formed by (1) inputting an object data to the computer, (2) deriving the wave of an object on the hologram plane by computation of the diffraction image to produce a binary-coded recording pattern, (3) forming an original picture drawing, and (4) reducing the original picture by photographing (completion of the hologram).

To reduce the amount of information to be computed, a hologram is created by dividing the hologram plane into a large number of small picture points (called "cells"), computing a diffraction pattern at the representative point of each cell to derive the complex amplitude and phase of each point, and giving an opening to each cell according to the computation results. The opening given to each cell is determines as follows: the height of opening is determined in accordance with the computed value of the complex amplitude of a corresponding cell, whereas the positional relation (distance) between the center of the opening and the cell center is determined in accordance with the value of the phase. The method of determining the size and position of the opening for each cell is described in detail in A. W. Lohmann & D. P. Paris "Binary Fraunhofer Holograms generated by Computer" Appl. Oct., Vol. 6, No. 10 (October 1967) at pp. 1739–1748. An original object image can be optically reconstructed or reproduced by applying a coherent reconstructing light such as laser light to the recorded hologram. A resultant reproduced image obtained from the computer hologram, however, is not satisfactory in the image quality. This is because the center of the cell opening is positionally deviated from the representative point used as the basis for computations of phase.

Another method of forming a computer hologram is also known which is based on the computation of a fringe-shaped interference pattern. The interference computation type computer-generated holography is conceptually similar to a conventional optical hologram forming scheme in that a reference light emitted from a laser source is superposed on the diffraction image of an object of interest to derive an interference pattern therebetween. The recording of a hologram is performed so that the transmissivity or the density may vary on a photographic plate in accordance with the intensity of a resulting fringe-like interference pattern.

According to the interference computation type computer-generated holography, unlike the aforementioned diffraction computation type (i.e., Lohmann type) computer-generated holography, the phase information of a holographic image is recorded in the interference fringe form. The phase error can thus be minimized, which leads to enhancement of the image quality. However, the interference computation type holography suffers from the decreased computation efficiency due to the fact that the decisive means for reducing the amount of information used to compute the interference pattern has not been accomplished yet. Extra large-capacity semiconductor memories are necessary to execute the computation for an enormous amount of information. This results in that the scale of the hologram recording system is increased unwantedly, which makes almost impossible the accomplishment of a high-speed computation process with the use of a smaller computer system. This is a serious bar to the industrial spread of the computer hologram recording system.

Further, as a method for creation of the computer hologram, a method (Kinoform) for deriving phase data of the diffraction wave of an object and directly recording the data on a phase modulation type medium is known. In the hologram of a type which is based on the diffraction wave of the object as described above, since the spatial frequency of information to be calculated can be made lower than that of the interference fringe type, the amount of information to be processed or the amount of calculations can be reduced. However, even in this case, since a relatively large amount of error components of the wave front may remain if the light modulation is effected by use of a less amount of information, unnecessary diffraction light will occur, thereby causing a problem that an image to be displayed becomes dark or the quality of the image is lowered. In order to solve the above problem, it is necessary to increase an amount of information to be processed and effect a large amount of calculations, and as a result, it becomes difficult to construct a practical system.

SUMMARY OF THE INVENTION

It is therefore an object of the present invention to provide a new and improved computer-assisted holographic-display technique.

It is another object of the invention to provide a new and improved computer-assisted holographic-display technique capable of enhancing the computation efficiency while maintaining high quality of a reproduced image.

In accordance with the above objects, the present invention is drawn to a specific computer-assisted holographic-display apparatus which comprises a first computation section for receiving an input image signal representing an object and computing corresponding diffraction pattern data with a first sampling density. A second computation section is connected to the first computation section to subject the diffraction pattern data to the interpolation process so as to create interpolated diffraction pattern data with a second sampling density which is thus increased. A third computation section is connected to the second computation section to compute interference pattern data between the interpolated diffraction pattern and the reference wave. A display section is connected to the third computation section to form an interference pattern on a display device based on the interference pattern data and to form a wave front corresponding to an image of the object by illuminating a reconstructing light to the interference pattern.

In accordance with the above objects, the present invention is drawn to a specific computer-assisted holographic-display apparatus which includes a first computing section for receiving an input image signal expressing an object and calculating corresponding diffraction pattern data with first sampling density. A second computing section is connected to the first computing section to subject the diffraction pattern data to the interpolation process so as to create interpolated diffraction pattern data having second sampling density. A display section is connected to the second computing section to create a phase modulation pattern corresponding to the diffraction pattern on a previously selected display device by use of the diffraction pattern data, modulate a reconstructing light by use of the phase modulation pattern and create wave fronts of light corresponding to the object image.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 8 is a block diagram showing the internal construction of an interference fringe pattern generator of FIG. 1;

FIG. 11 is a block diagram showing a first example of the internal construction of a image display section of FIG. 1;

FIG. 12 is a block diagram showing a second example of the internal construction of a image display section of FIG. 1;

FIG. 13 is a block diagram showing a third example of the internal construction of a image display section of FIG. 1;

FIG. 14 is a block diagram showing an example of the internal construction of a display subunit of FIG. 1.

DETAILED DESCRIPTION OF THE PREFERRED EMBODIMENT

Figure 1:
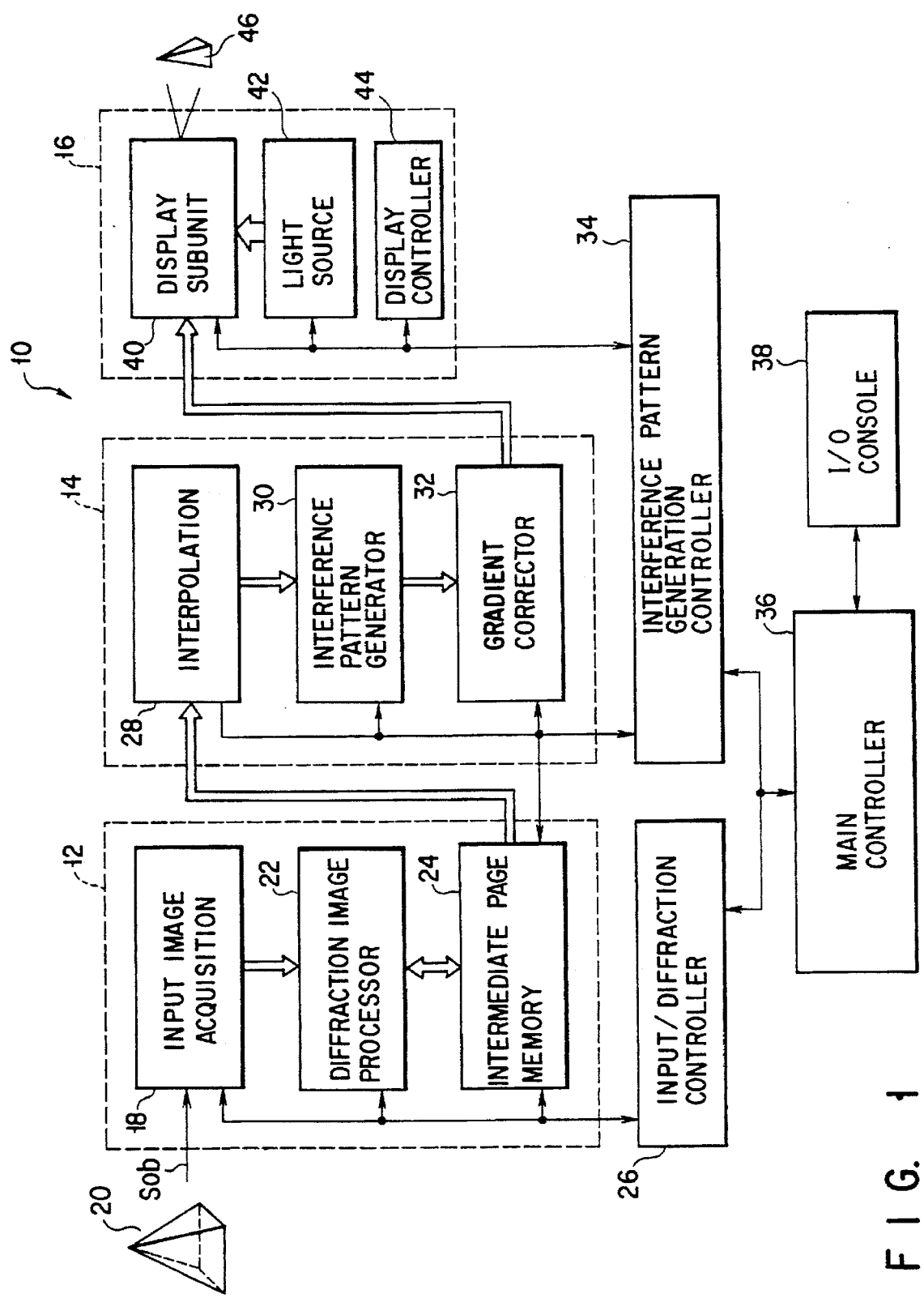
FIG. 1 is a block diagram schematically showing the whole construction of a computer-assisted holographic-display apparatus in accordance with one preferred embodiment of the present invention.

Referring now to FIG. 1, a computer-assisted holographic-display apparatus in accordance with one preferred embodiment of the present invention is generally designated by the numeral 10. The computer-assisted holographic-display apparatus 10 includes a diffraction image computation section 12, an interference image computation section 14 and an image displaying section 16. The diffraction image computation section 12 has a function of computing a diffraction image (diffraction pattern) information data based on a sampled input image data representing an object of interest (20) in the hologram forming process. The interference image computation section 14 and image displaying section 16 compute interference image information data indicative of an interference pattern between the resultant diffraction pattern data and a reference light data, and display the same on a preselected displaying device.

The diffraction image computation section 12 includes an input image acquisition section 18 for receiving a sampling image data being externally supplied thereto. The input image acquisition section 18 receives a sampling object image signal Sob, which is produced by the photoelectric conversion to represent an object of interest 20 by means of an external photoelectric converting image photographing unit (not shown). Alternatively, the input image acquisition section 18 may be connected to an external computer graphics creation equipment (not shown); in such a case, the equipment internally produces a graphic image signal Sob that represents the object 20 without requiring any optical photographing process of the object 20. In either case, the input image acquisition section 18 contains a semiconductor page memory for temporarily storing the input image signal Sob therein. The page memory will be designated by the numeral 52 in FIG. 2.

The diffraction image computation section 12 also includes a diffraction image processing section 22 for computing a diffraction image or pattern and an intermediate page memory 24 which is bi-directionally communicative with the diffraction image processor 22. The intermediate memory 24 temporarily stores therein a computed diffraction pattern information that is output by the diffraction image processor 22 therein. The above constituents 18, 22 and 24 are connected to an input/diffraction image control section 26.

As shown in FIG. 1, the interference image computation section 14 includes (1) an interpolation processing section 28 coupled to an output of the intermediate page memory 24, (2) a processing section 30 connected to the interpolation processor 28 to produce an interference image or pattern, and (3) a gradient correcting section 32 connected to the interference image generator 30. The constituents 28, 30, 32 are connected to an interference image generation control section 34 and operate under the control of the controller 34. The intermediate memory 24 of the diffraction image computation section 12 is also connected to the controller 34. The controllers 26, 34 are associated with a main controller 36. An input/output console section 38 is connected to the main controller 36. The I/O console 38 includes a known keyboard unit and display terminal such as cathode-ray tube (CRT) display terminal or a flat-panel display device, as a man-machine interface.

As shown in FIG. 1, the image display section 16 includes a display subunit 40, light source 42, and display control section 44. The display section 16 forms an interference pattern on a spatial light modulator of the display subunit 40 based on finally obtained interference pattern data, modulates an output light of the light source 42 and displays the object image.

Figure 2:
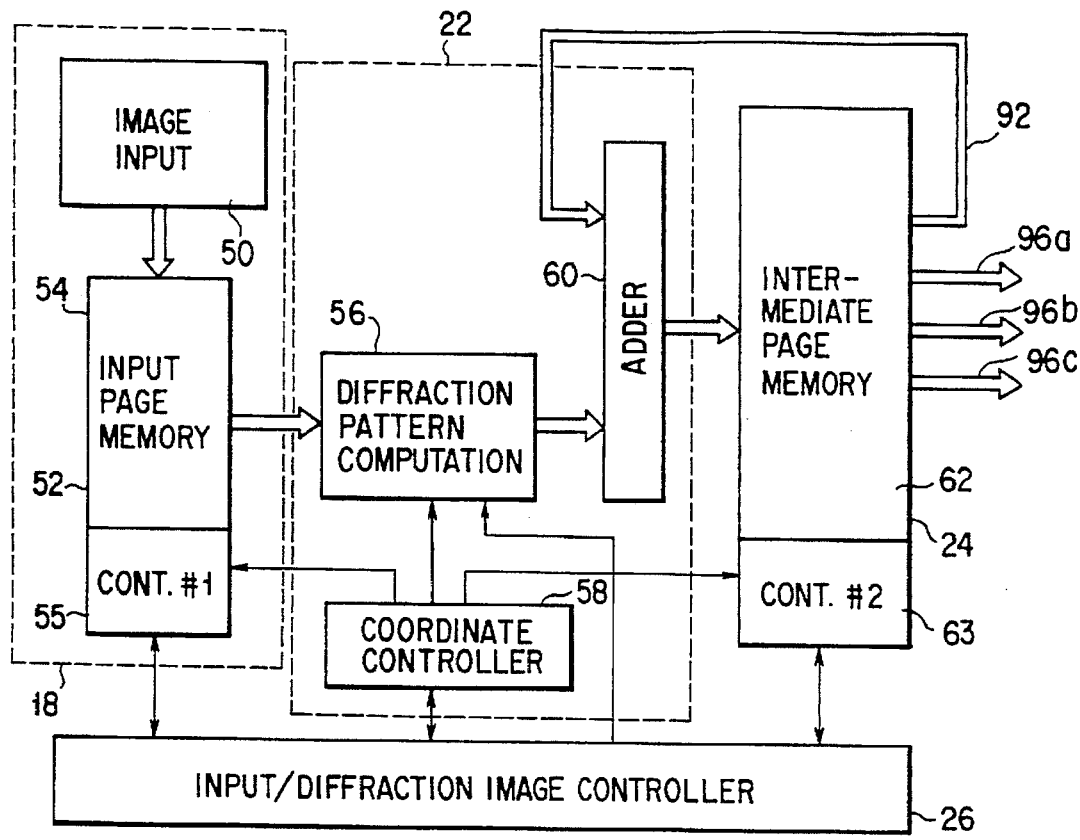
FIG. 2 is a diagram showing the internal construction of a diffraction-image computation section contained in the computer-assisted holographic-display apparatus of FIG. 1.

As shown in FIG. 2, the input image acquisition section 18 includes an image data input unit 50 and a page memory unit 52 connected to the output of the image input 50. The page memory 52 includes a memory area 54 and a memory controller 55 associated therewith. The diffraction image processor 22 includes a diffraction pattern computation unit 56, coordinate control unit 58 and adder 60. The computation unit 56 computes a two-dimensional (2-D) diffraction pattern which is obtained on the hologram recording surface with respect to each cell of the sampling input image data stored in the page memory 52. The diffraction pattern thus computed is sequentially supplied to a first input of the adder 60 under the control of the coordinate controller 58. The adder 60 has an output connected to a memory area 62 of the intermediate page memory 24. The page memory area 62 is provided in the intermediate page memory 24 together with a memory controller 63. The intermediate page memory area 62 has a plurality of outputs (for example, four outputs 92, 96a, 96b and 96c), one of which (92) is fed back to a second input of the adder 60.

The diffraction pattern computation unit 56 fetches data of one input cell read out from the input page memory 52 and computes the two-dimensional (2-D) diffraction pattern thereof. The result of computation is supplied to the first input of the adder 60. At this time, the second input of the adder 60 is supplied with data read out from the intermediate page memory 24. Data items supplied to the first and second inputs of the adder 60 are added together and the updated result of computation appears on the output of the adder 60. The updated result of computation is written into the intermediate page memory 24 again. Thus, diffraction patterns derived by the adder 60 for respective picture elements (PEL) or cells of the input image are added together to create a diffraction pattern which is obtained as the result of addition at every picture element and which is kept stored in the intermediate page memory 24 for later use.

Each picture element (cell) of diffraction image data essentially consists of two multivalued gradient data segments which are the real part and imaginary part of a complex number. The operations of writing the diffraction pattern data into the intermediate page memory 24 and of reading the data from the memory 24 are carried out sequentially and alternately. The 2-D coordinate position control in the image space for a series of memory access operations is effected in accordance with coordinate data generated by the coordinate controller 58. A cell position whereat the input image is read and a cell position of the diffraction pattern are determined under the control of the controller 58; then, the positional superposition of each of the diffraction patterns in the intermediate page memory 52 is effected. As a result, final diffraction pattern data is written into the memory area 62 of the intermediate page memory 24.

Figure 3:
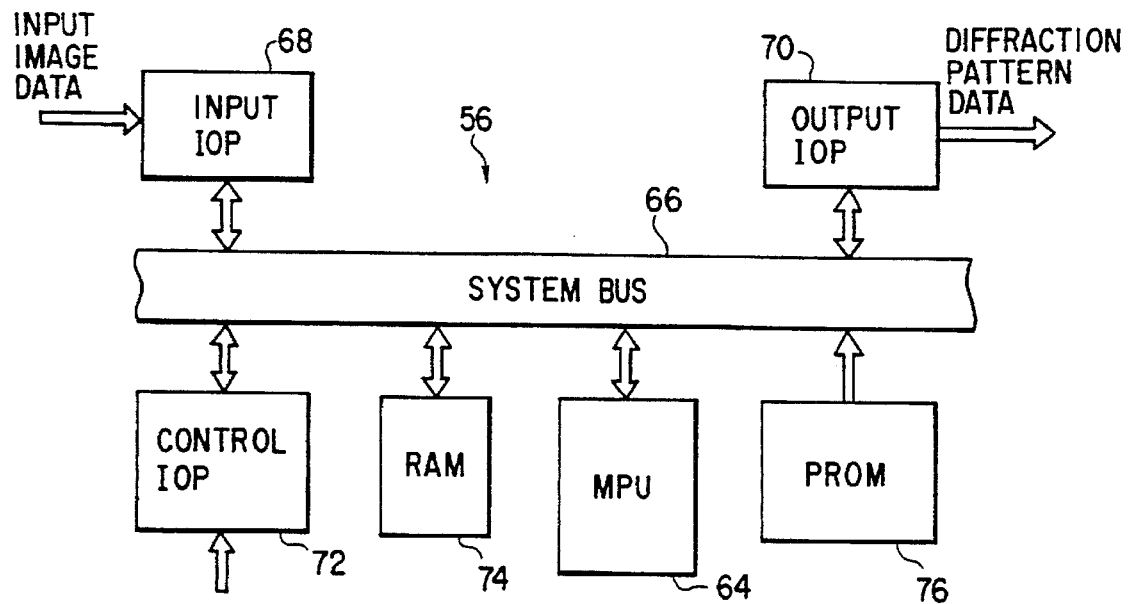
FIG. 3 is a diagram showing the internal construction of a main computation unit contained in the diffraction image computation section of FIG. 2.

The computation algorithm for deriving diffraction patterns of the hologram may be determined differently depending on the type of the hologram to be formed. For example, in a Fresnel's hologram used when the distance between an object and the hologram plane is relatively short, the approximate computation for a Fresnel diffraction image can be made by use of Fresnel integrals. Alternatively, in a Fourier transform hologram used when the distance between the object and the hologram plane is relatively long, the approximate computation of Fraunhofer diffraction image can be applied by use of the Fourier transform. Further, in the image hologram, rainbow hologram, holographic stereogram, or the like, diffraction calculations effected in a direction opposite to the actual light traveling direction may be used. To flexibly cope with such different types of holograms, the diffraction pattern data computation unit 56 of this embodiment is constructed by use of a microprocessing unit (MPU) 64 as shown in FIG. 3.

More specifically, the MPU 64 is connected to an internal system bus 66 of the diffraction pattern computation unit 56 together with an input-stage data input/output port (IOP) 68, an output-stage data IOP 70, a control-signal IOP 72, a random access memory (RAM) 74 and a programmable read-only memory (PROM) 76. The input IOP 68 receives an input image data and supplies the same to the system bus 66. The output IOP 70 receives the result of computation by the diffraction pattern computation unit 56 appearing on the system bus 66 and sends forth the same to the adder 60 of FIG. 2. The control IOP 72 is used to receive various kinds of control information signals that are supplied from a host control machine such as a host computer (not shown). The PROM 76 stores therein one or a plurality of computation algorithm software programs externally supplied via the system bus 66. In the case of the plurality of different kinds of algorithm software programs being stored in the ROM 76, one of the algorithms which is optimum for the type of a presently selected hologram can be made active in reply to an instruction from the control IOP 72. Further, various parameters of hologram models including the positional relation between the hologram and the object, wavelength and the like can be externally set in the control IOP 72. The MPU 64 performs processing operations according to the current parameter setting state in the control IOP 72.

By way of an example, assume that the Fresnel's hologram of a two-dimensional (2-D) object image is computed. The following algorithm is used to derive Fresnel diffraction image data. Firstly, the 2-D image is sampled and a set of sampled values is derived. The sampling density at this time may be determined depending on the performance of a system hardware actually used and/or the required quality of an image reproduced from the hologram; in practice, the sampling density may be so selected as to offer the resolution of approximately eight to ten dots per one millimeter. In the above sampling process, the operation of enlarging or reducing the 2-D image may be additionally effected; in this case, the hologram recording apparatus 10 is so designed to have the hologram enlarging/reducing function.

A 2-D Fresnel diffraction pattern is then computed which is formed on the hologram plane by a light component emitted from one of a large number of resultant sampling points is computed. A similar diffraction pattern computation is repeatedly executed with respect to each of the remaining sampling points. The diffraction pattern computation may be made under an assumption that the wavefront of light emitted from a point light source is computed. The diffraction pattern computation may alternatively be made under an assumption that a small opening is formed in each of the sampling points and the wavefront of light is computed which light is transmitted through the small opening when a plane wave of an intensity corresponding to the sampling value of the sampling point is applied to the opening from the rear side thereof. In either of the above cases, Fresnel integrals are used for the computation of diffraction image pattern as is well known to the experts in the art of the computer hologram. A Fresnel diffraction image pattern obtained from each sampling point is added to those of the remaining sampling points to finally derive Fresnel diffraction pattern information of the 2-D object.

The Fresnel diffraction pattern computation for a 3-D object may be attained by expanding the above-described 2-D object processing technique in such a manner that (1) the technique is modified to assign a sampling value to each point of a 3-D grating so as to represent sampling values in a 3-D space or (2) the technique is modified to represent surfaces of a 3-D object by use of a set of sampling points having respective sampling values and add together Fresnel diffraction patterns derived from the sampling points. If desired, removal of hidden surfaces (hidden-surface removal) may be performed.

The diffraction pattern computation with the lower sampling density as described above is effected automatically according to the algorithm software program being currently selected in the PROM 76 by the MPU 64 of FIG. 3. The computed diffraction pattern data is supplied to the intermediate page memory 24 of FIG. 2 and stored in the memory area 62 thereof. The internal construction of the intermediate page memory 24 is shown in detail in FIG. 4.

Figure 4:
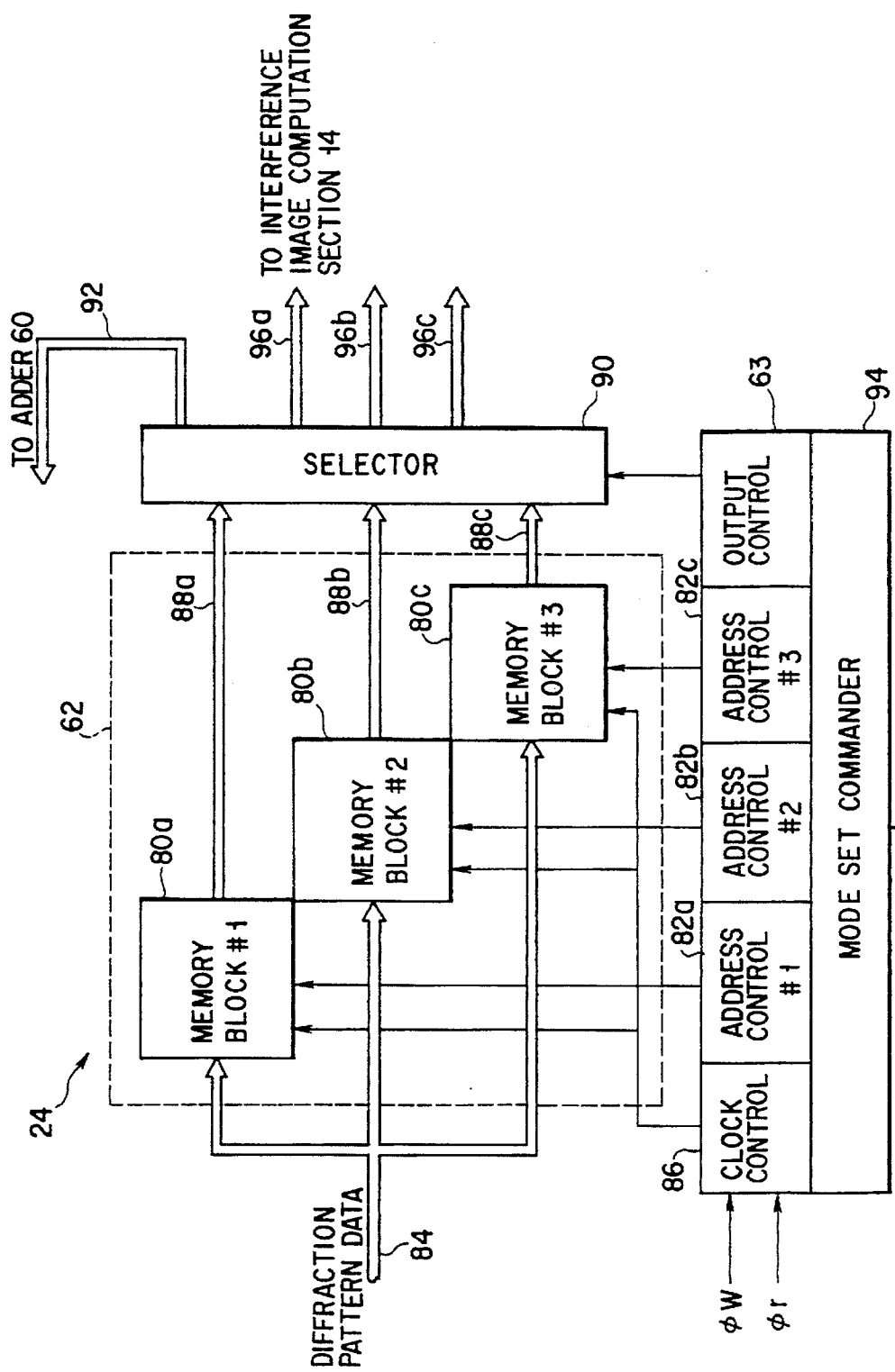
FIG. 4 is a diagram showing the internal construction of an intermediate page memory unit contained in the diffraction image computation section of FIG. 2.

As shown in FIG. 4, the memory area 62 of the intermediate page memory 24 is divided into a plurality of memory blocks, for example, three memory blocks 80a, 80b, 80c. The memory blocks 80 are associated with exclusive address controllers 82a, 82b, 82c, respectively. The number of memory blocks 80 is determined according to the number of pipe lines used in the interference fringe computation and hologram recording process effected by the interference image computation section 14 of FIG. 1. In this embodiment, the number is set to correspond to the number of divisions of the recording beam of the multi-beam scanning printer 40.

The three memory blocks 80a, 80b, 80c are connected to the diffraction image processor 22 via a branched data bus 84. The memory blocks 80 are connected to a common clock control unit 86. The control unit 86 is supplied with a write clock signal $\phi$ w and a read clock signal $\phi$ r. The data blocks 80 are respectively connected to three inputs of a selector 90, which performs the data selecting operation under the control of an output control unit 63 via data buses 88a, 88b, 88c. The selector 90 has four outputs, one of which is connected to the adder 60 of FIG. 2 through a feedback data bus 92. The remaining three outputs of the selector 90 are connected to the interference image computation section 14 of FIG. 1 by way of respective data buses 96a, 96b, 96c.

The intermediate page memory 24 has two different operation modes. The first operation mode is a "read modify write" mode in which diffraction pattern addition data is read out and diffraction pattern data is written into the same memory address. In this mode, the whole memory space of the three memory blocks 80 is regarded as a sheet of page memory and the entire memory address control is effected by the address memory control units 82. The second operation mode is a "separate read/write" mode, wherein the three memory banks 80 are independently accessed by the respective address control units 82 and diffraction pattern data items stored therein are separately read out and supplied to the selector 90. Selective specification of one of the above two modes or switching between the two modes is controlled by a mode setting commander 94 associated with the units 63, 82 and 86. The selector 90 sends forth diffraction image data items collectively or separately read out from the memory banks 80a, 80b, 80c via data buses 96a, 96b, 96c which are connected to the three outputs thereof.

Figure 5:
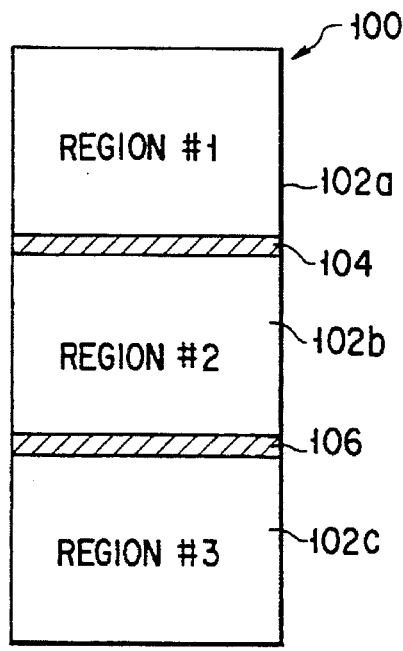
FIG. 5 is an illustration modeling a method of performing the internal division for a memory space of the intermediate page memory of FIG. 4.

The internal division of the memory space of the intermediate page memory 24 is shown in a model form in FIG. 5, wherein the two-dimensional pattern of one sheet of diffraction pattern computed by the diffraction pattern processor 22 is designated by the numeral 100. The pattern 100 is subdivided into three areas 102a, 102b, 102c which slightly overlap each other at their end portions. Write operations of data into the three areas 102a, 102b, 102c are respectively effected by use of the three memory blocks 80a, 80b, 80c shown in FIG. 4. An overlapping portion 104 between the first and second areas 102a, 102b is hatched for illustration purposes only. This is also applied to an overlapping portion 106 between the second and third areas 102b, 102c. Each of the overlapping portions 104, 106 corresponds to the width of one line of a diffraction pattern data having the sampling density. The double control for diffraction pattern data in each overlapping portion assures that image data is prevented from being accidentally removed in the interpolation process described later.

The interpolation processor 28 of FIG. 1 performs a specific interpolation process which matches the coarse sampling density of diffraction pattern data stored in the intermediate page memory 24 with the precise sampling density of interference pattern data of a holographic image finally recorded on the photographic plate 44. In principle, the interpolation process is equivalent to the line density converting process to be effected in the ordinary image processing field. This embodiment uses a 2-D interpolation process for electronically effecting the line interpolation in the main scanning direction X of the diffraction image pattern and the sub-scanning direction Y transverse to the main scanning direction.

Figure 6:
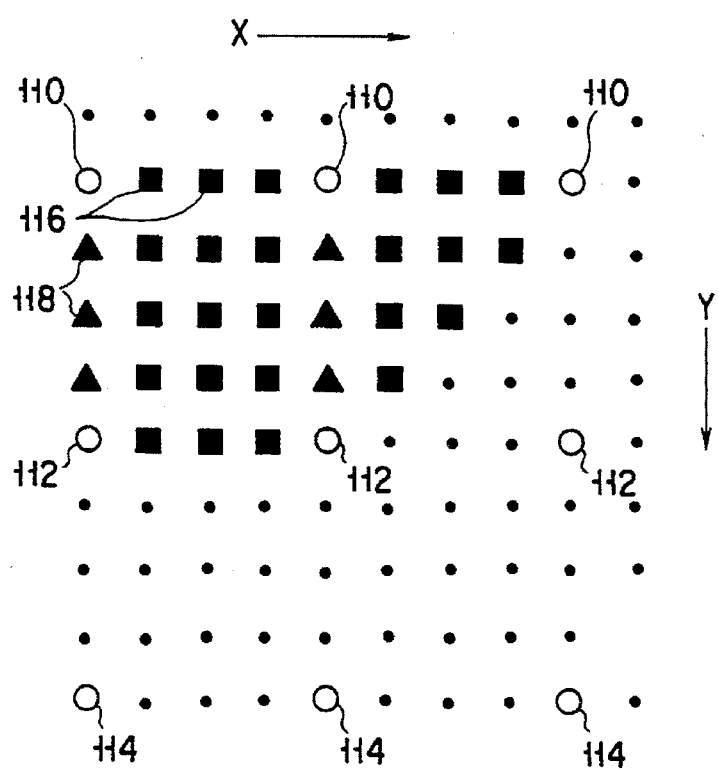
FIG. 6 is an illustration partially indicating the diffraction pattern which is interpolated in the main scanning direction X and the sub-scanning direction Y.

In FIG. 6, a diffraction pattern is partly illustrated. For purposes of explanation, nine white circles of three rows and three columns are used to represent sampling points of the diffraction image pattern. The first row of three sampling points 110 aligned in the main scanning direction X corresponds to an i-th line of the diffraction pattern. The remaining two rows of sampling points 112, 114 respectively correspond to (i+1)th and (i+2)th lines of the diffraction pattern.

Assume that a three-point interpolation scheme is adopted for a space between adjacent ones of the sampling points 110, 112, 114. Three interpolation points 116 indicated by black squares and arranged along a first direction D1 (one of the main scanning direction X and the sub-scanning direction Y) between adjacent ones of the sampling points 110 of the i-th line are first computed by use of the density information of the sampling points 110 and added at a constant interval. The density values of the points 110, 116 are computed, and interference fringe data of one line is then computed based on diffraction image data of one-line density value by means of the interference pattern generator 30 of FIG. 1. After a corresponding scanning record operation is effected or while the operation is being effected, the same three-point interpolation process is effected for the following (i+1)th line of sampling points 112 in the first direction D1. Then, the secondary interpolation process is effected along a second direction D2 transverse to the first direction D1 (the other of the main and sub-scanning directions X and Y) between the i-th and (i+1)th lines, and as a result, interpolation points indicated by black triangular marks 118 in FIG. 6 are added between the sampling points 110 and 112. At this time, interpolation points which are indicated by the same black square marks as the interpolation points 116 and which correspond in number to the interpolation points 116 in the first direction D1 are added between the interpolation points 116 in the direction D1. The interpolation process in the above two directions D1, D2 is repeatedly effected for the remaining lines of the diffraction image pattern in the same manner as described above, and as a result, a two-dimensionally interpolated diffraction pattern with a sampling density which is increased in both of the both directions D1, D2 is attained. In FIG. 6, repetition of square marks is omitted for purposes of illustration.

Figure 7:
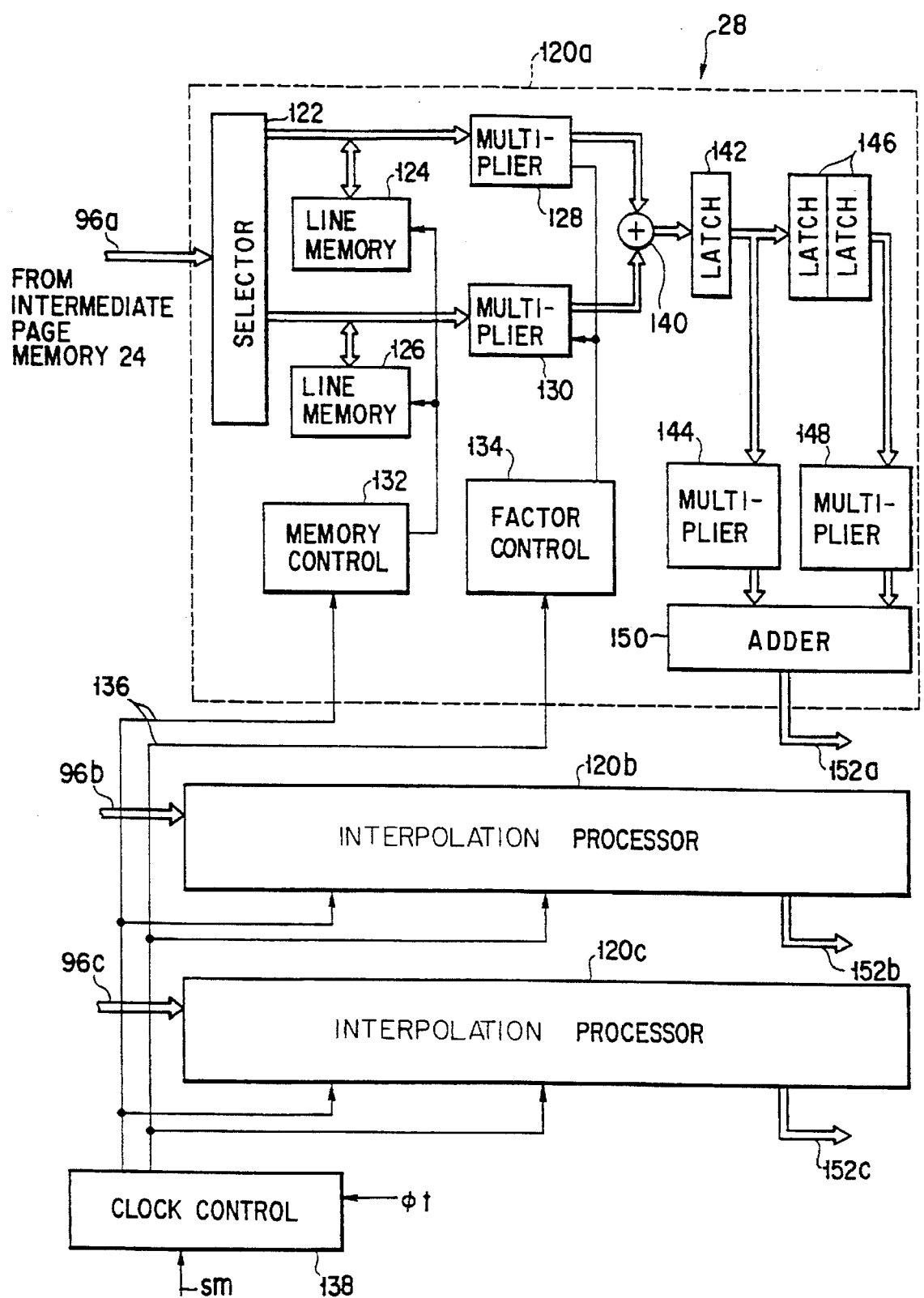
FIG. 7 is a block diagram showing the internal construction of an interpolation processor of FIG. 1.

In order to enhance the performance of the interpolation process in the two directions, it is recommendable to construct the interpolation processor 28 as shown in FIG. 7. The interpolation processor 29 essentially consists of three parallel interpolation processing units 120a, 120b, 120c which are respectively connected to output data buses 96a, 96b, 96c of the intermediate page memory 24. The number (channel number) of the interpolation processing units 120a, 120b, 120c used is determined according to the number of pipe lines at the succeeding stage. The three-channel interpolation processing units 120a, 120b, 120c are similar in circuit configuration to one another; the internal construction of only the unit 120a is shown in FIG. 7 to avoid redundancy in the drawing.

As shown in FIG. 7, the interpolation processing unit 120a includes a selector 122 connected to the data bus 96a.

The selector 122 has two outputs, which are respectively connected to two line memories 124, 126 and two coefficient multipliers 128, 130. The line memories 124, 126 are controlled by a control unit 132. The coefficient multipliers 128, 130 are controlled by a control unit 134. The controllers 132, 134 are connected to a clock control unit 138, to which a clock signal φ t and an interpolation command signal Sm are supplied via clock signal supplying lines 136.

The two coefficient multipliers 128, 130 have outputs connected to first and second inputs of an adder 140. An output of the adder 140 is connected to another coefficient multiplier 144 via a latch circuit 142. An output of the latch circuit 142 is connected to still another coefficient multiplier 148 which is coupled to an adder circuit 150 together with the multiplier 144 via two series-connected latch circuits 146. The adder 150 has an output coupled to a data bus 152a, through which resultant interpolated pattern data is sent forth toward the interference pattern generator 30 shown in FIG. 1. Each of the coefficient multipliers 128, 130, 144, 148 may be constructed by a ROM for storing previously selected coefficients and a circuit for multiplying the coefficient by an input signal.

Diffraction image data is sequentially input to the selector 122 of FIG. 7 for each line data component in the main scanning direction. The selector 122 alternately supplies input data components to the two line memories 124, 126. The line data components are written into the memories 124, 126 under the control of the controller 132. The controller 132 is supplied with a clock signal corresponding to the distribution of pixels by means of a clock controller 138. Data items written into the line memories 124, 126 are read out from the line memories for each pixel and respectively transferred as image signals to the coefficient multipliers 128, 130 which in turn multiply the data items by a preset coefficient. The image signals multiplied by the preset coefficient are weighted image signals which are added together by the adder 140, thus effecting the line density conversion in the sub-scanning direction.

The output of the adder 140 is transferred to the coefficient multiplier 144 via the latch circuit 142 and also supplied to the other coefficient multiplier 148 via the latch circuit and the two-stage latch circuit 146. The coefficient multipliers 144, 148 perform the weighting process for the line density conversion in the main scanning direction. Addition of the two-stage latch 146 provides a signal delay necessary for synchronizing the timings of inputs of the alternately transferred real and imaginary parts of the complex number of the diffraction image data to the multipliers 144, 148 in order to stably attain the mutual comparison between the real and imaginary parts. The weighted image signals created by the multipliers 144, 148 are added together by an adder 150 so as to achieve the line density conversion process in the respective scanning directions. Note that coefficient data items stored in internal ROMs (not shown) with known construction of the multipliers 128, 130, 144, 148 are repetitively read out in synchronism with a clock signal from the clock controller 138. The magnitude in the weighting process may be changed by changing the values of coefficient data items; therefore, various interpolation processes other than the linear interpolation can be applied.

The diffraction image pattern data items subjected to the interpolation process to have a sampling density increased as described above are supplied to the fringe-form interference pattern generator 30 of FIG. 1 via output data buses 152a, 152b, 152c. The fringe-form interference pattern generator 30 computes a fringe-form interference pattern created by superposition of an interpolated diffraction image pattern and the reference light according to a previously given computer algorithm and creates an electrical information signal for numerically emulating the optical fringe-form interference pattern.

As shown in FIG. 8, the fringe-form interference pattern generator 30 essentially consists of three parallel interference pattern processing units 160a, 160b, 160c which are respectively connected to the data buses 152a, 152b, 152c. The three-channel interference pattern processors 160 are connected to a master controller 162 which effects the supervisory services/control operation relating to the interference image computation containing the parameter setting control and coordinate management control with respect to the processors 160. The interface pattern processors 160 have the same circuit construction, and therefore, the internal construction of only one (160a) of them is shown in FIG. 8.

As shown in FIG. 8, the interface pattern processor 160a includes two data latch sections 164, 166 which are connected to the data bus 152a and which respectively latch data components of the real and imaginary parts of input diffraction image data therein. The interference pattern processor 160a includes a reference light wave generating circuit 168 which supplies a wavefront information signal mathematically representing the wavefront of the coherent reference light (which may be a plane wave or spherical wave) to two data latch sections 170, 172. The data latch sections 170, 172 respectively latch the real and imaginary parts of the reference light signal therein.

The latch sections 160, 170 for latching the real part data components of the diffraction image and reference light have outputs connected to a multiplier 174. The remaining latch sections, that is, the latch sections 166, 172 for latching the imaginary part data components of the diffraction image and reference light have outputs connected to another multiplier 176. Outputs of the multipliers 174, 176 are connected to an adder 178. The adder 178 is coupled at its output to a first input of a multiplier 180. The multiplier 180 has a second input connected to a ROM 182 for storing coefficients. An output of the multiplier 180 is connected to a first input of an adder 184. The adder 184 has a second input connected to a ROM 186 for storing bias constants and an output coupled to a data bus 188a. The ROMs 182, 186 are associated with a coefficient setting unit 190 which specifies one of the values of coefficients stored in the ROMs in response to a selection signal Ss from the master controller 162.

The interference fringe data forming operation of the interference pattern processor 160a is as follows. When interpolated diffraction image data is input, the real part thereof is multiplied by the real part of reference light data created by the reference light wave generator 168 at each sampling point by use of the multiplier 174. Likewise, the imaginary part of the input diffraction image data is multiplied by the imaginary part of the reference light data at each sampling point by use of the multiplier 176. The results of calculations of the multipliers 174, 176 are added together in the adder 178 to create data of components necessary for reproduction of the object image of fringe-form interference pattern of the hologram.

The amplitude of interference pattern data output from the adder 178 is also deflected in the negative-polarity direction. In order to adjust the amplitude value of the interference pattern data, an output of the adder 178 is supplied to the multiplier 180 which multiplies a coefficient supplied from the ROM 182 by the interference pattern data. Further, an output of the multiplier 180 is added to the bias constant supplied from the ROM 186 in the adder 184 so as to force the interference pattern data to have only the positive amplitude value. The positive amplitude adjusting process is based on the fact that it is difficult in principle to deal with negative values when forming the hologram on the spatial light modulator 220. By repeatedly effecting the similar operations, hologram interference pattern data of the object 20 can be obtained.

Figure 9:
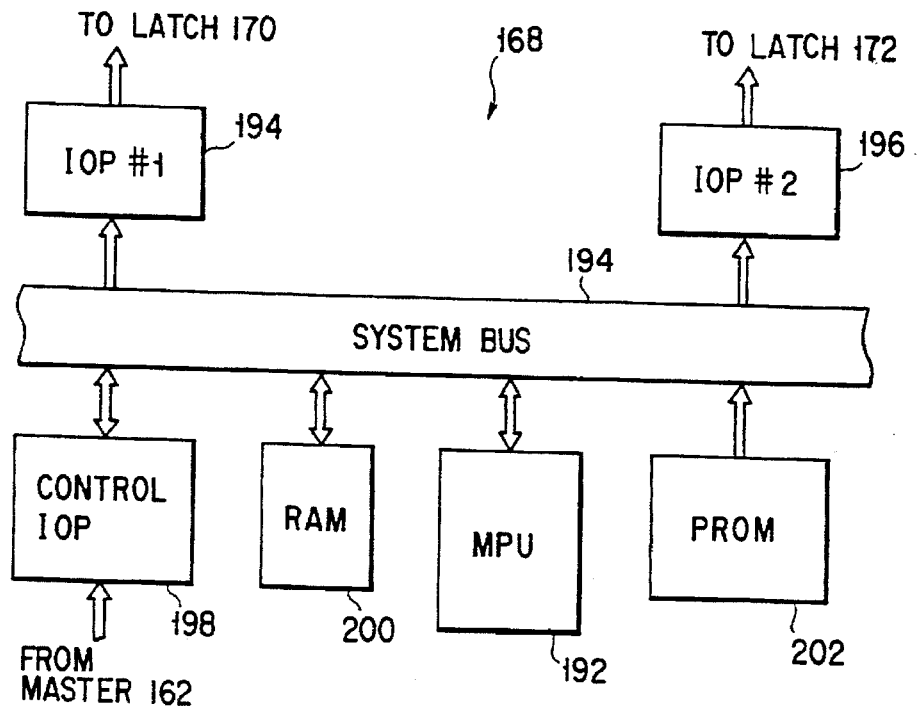
FIG. 9 is a block diagram showing the internal circuit construction of a reference light wave generator of FIG. 8.

As shown in FIG. 9, the reference light wave generator 168 includes an MPU 192 associated with a system bus 193. Two input/output ports or IOPs 194, 196 are connected to the system bus 193 together with a control IOP 198, RAM 200 and PROM 202 so as to be mutually communicated therewith. The PROM 202 stores a[n] processing algorithm software program for the MPU 192 in a modifiable form. A control IOP 198 plays a role of signal transfer for fetching various control signals from the master controller 162. The IOP 194 supplies reference light real part data to the latch 170 of FIG. 8. The IOP 196 supplies reference light imaginary part data to the latch 172 of FIG. 8. The MPU 192 effects optimum reference light wavefront computation for a currently desired type of hologram based on various hologram parameters (such as wavelength, direction, incident angle, reference light source position, light intensity) set by the control IOP 198. The result of computation of the interference pattern generator 30 is the amplitude and phase distributions of wave disturbance which is obtained by representing the interference pattern of the hologram by the distribution of light intensity and which is supplied to the gradient corrector 32 of FIG. 1 via the data buses 188a, 188b, 188c.

The gradient correcting unit 32 has a function of changing the gradation characteristic in accordance with the display characteristic of the display unit 16 and suppresses reduction in the diffraction efficiency and occurrence of noises caused by the distortion of the wave front finally reproduced. The gradation characteristic of the hologram is largely dependent on the amplitude transmission characteristic or phase modulation characteristic. In the present optical interference method, the gradation characteristic is dependent on the characteristic of the recording material itself which is made optimum according to the density characteristic, and therefore, it is difficult to control the gradation characteristic. Excellent controllability can be attained by use of the gradient correcting unit 32 and desired amplitude transmission characteristic and phase modulation characteristic can be realized, which leads to the high quality of the hologram.

Figure 10:
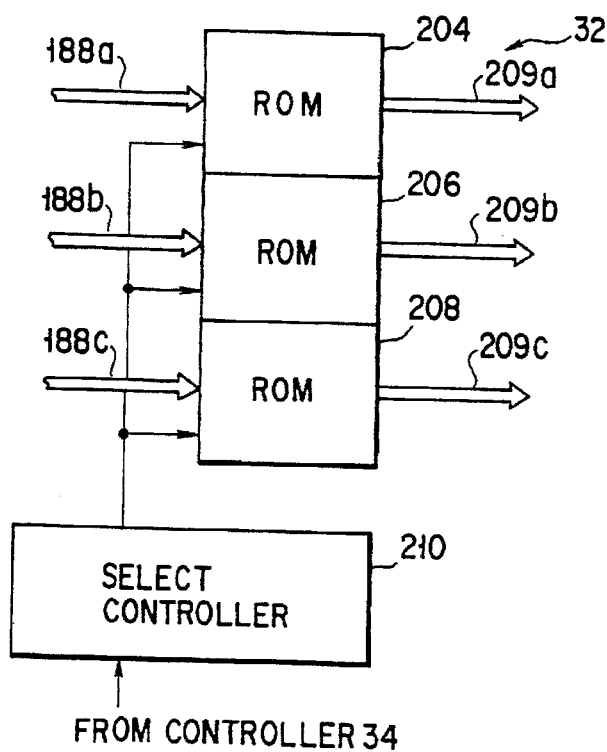
FIG. 10 is a block diagram showing the internal circuit configuration of a gradient corrector of FIG. 1.

As shown in FIG. 10, the gradation correcting unit 32 includes three ROMs 204, 206, 208 corresponding to the 3-channel pipe-line structure. The ROMs are operated under the control of the select controller 210. Each image dot of input interference data has the gradation expressed by a predetermined number of bits (for example, 8 bits). The ROMs 204, 206, 208 have gradation correcting tables stored therein. Interference pattern data is subjected to the gradation correcting process according to the gradation correction tables and thus corrected interference pattern data is output. The data is supplied to the display subunit 40 of the image display section 16 of FIG. 1 via the data buses 209a, 209b, 209c. The gradation characteristic can be freely selected by control of the select controller 210; therefore, even if the display unit and/or desired gradation characteristic is changed, the request by the user can be easily satisfied.

The image display section 16 includes a display subunit 40, light source 42, and display control section 44. The display section forms an interference pattern on the spatial light modulator of the display subunit 40 based on interference pattern data derived by calculation, modulates an output light of the light source 42 or reconstructing light 230 and displays the object image 46.

A first example of the image display section 16 is shown in FIG. 11.

When an interference pattern is formed on a spatial light modulator (SLM) 220, the hologram interference pattern is expressed as a variation in the complex amplitude. In the conventional hologram for recording an image on the silver-salt medium (film), the interference pattern is recorded on the medium as a variation in the amplitude transmittance or a variation in the phase, but in the present invention, the interference pattern is formed as a variation in the complex amplitude so that the degree of freedom or the precision of light modulation can be enhanced and the quality of the reproduced image can be enhanced. The SLM 220 may be any type which has pixels arranged in a 2-dimensional array manner with high density, for example, with a density of approx. 100 to 1000 pixels per millimeter and in which the complex amplitude transmittance of each pixel can be controlled from the exterior for each pixel. As a concrete example of the SLM, a liquid crystal panel which is constructed by a combination of a liquid crystal panel of intensity modulation type constructed by disposing twisted nematic (TN) liquid crystal between deflection plates and a liquid crystal panel of phase modulation type using liquid crystal of parallel orientation to effect the complex amplitude modulation is provided. In this example, a case wherein the interference pattern is formed in the form of complex amplitude modulation, but it may be realized by modulation based only on the amplitude transmittance or phase variation. As an SLM other than the liquid crystal type, a deformable mirror device (DMD, L. J. Hornbeck; "deformable-mirror spatial light modulators", Proc. of SPIE, vol. 1150, (1989) or IEDM93, pp 381 (1993)) may be used. Further, a spatial light modulator having no pixel structure can also be used.

The SLM 220 has a plurality of divided modulation areas and each area is independently driven by the driving circuit 222 in a parallel manner. The number of divided areas coincides with the number of divided memory areas of the intermediate page memory 24 described before. By driving the divided areas, the operation frequency of the driving circuit can be lowered and the circuit can be realized with low cost.

The display subunit 40 includes a light source 42 for projecting the reproduced light 230 which is a to-be-modulated light incident on the SLM 220. The light source 42 includes a highly coherent light emitting element 224 and a light collecting optical system 223 such as a collimator which is simple in construction, and provides a light 230 of wave front (plane wave, spherical wave, or the like) suitable for the application method of the actually used SLM. The light emitting element 224 is driven by the driving circuit 226.

The display controller 44 is connected to the driving circuit 226 of the light source 42, SLM driving circuit 222 and buffer circuit 244. The display controller 44 effects the entire control operation of the display by effecting the control of transfer of interference pattern data supplied from the gradient correcting unit 32 to the buffer circuit 244 and transferred to the SLM driving circuit 222 and the control of the light source 42 by use of the driving circuit 226 in the light source 42.

Another example of the image display section 16 is shown in FIG. 12. This example is obtained by using a plurality of light sources 42 in the example of FIG. 11. Three light sources 42a, 42b, 42c having different wavelengths of light are used, the lights are combined in a dichroic mirror (dichroic beam combiner 250) and then the resultant light is made incident on the SLM 220 of one display subunit. Time-sharing color display can be attained by sequentially activating the three light sources 42a, 42b, 42c in a time-sharing fashion and displaying an interference pattern corresponding to the wavelength of an element which is set in the ON state. In this example, a plurality of light sources 42a, 42b, 42c are used, but it is possible to provide a plurality of light emitting elements z224 and driving circuits 226 and combining lights of the respective light sources between the light collecting optical system and the respective light emitting elements.

Still another example of the image display section is shown in FIG. 13. This example is a modification of the example of FIG. 12, and in this example, a corresponding number of display subunits 40a, 40b, 40c are respectively provided for a plurality of light sources 42a, 42b, 42c, the light modulation is effected for each light source, and the lights after modulation are combined in the dichroic mirror. Since it is not necessary to effect display operations for the three light sources in a time-sharing fashion, the driving frequencies of the light sources and the SLM can be lowered, thereby making it easy to realize the apparatus.

An example of the display subunit 40 is shown in FIG. 14.

In this example, the display subunit 40 supplies part of a hologram interference pattern derived by calculation on the one-dimensional spatial light modulator (SLM) 220, modulates a reconstructing light 230 by use of the above part of interference pattern, and two-dimensionally scanning the thus modulated light 232 by a scanning optical system so as to display an object image 46.

A method for forming the interference pattern on the SLM 220 is the same as that of the above embodiment, but since an object image is displayed by optically scanning the light 232 modulated by the SLM 220, the display can be attained by use of an SLM having a less number of pixels (or small space bandwidth product), However, since a one-dimensional SLM is used, the correlation or continuity of the phases of the light wave fronts cannot be maintained in a direction perpendicular to the modulating direction and information of parallax in this direction cannot be incorporated, thus limiting the types of holographic images to be displayed.

The SLM 220 has a plurality of divided modulating areas which respectively correspond to different ultrasonic transducers and are independently driven by the driving circuit in a parallel manner. The number of divided areas coincides with the number of divided memory areas of the intermediate page memory 24 described before. By driving the divided areas, the operation frequency of the driving circuit or scanning system can be lowered and the apparatus can be realized with low cost.

As a concrete example of the SLM, an acoustooptic modulator (AOM) can be used, but it is not limited to this and may be a modulator of any type for effecting the 2-dimensional modulation.

A scanner 228 is driven by a driver circuit 240 to display a holographic image by scanning the light 232 modulated by the SLM 220 in the horizontal and vertical directions. Specifically, a polygonal rotating mirror or galvano-mirror may be used.

The display subunit 40 has a reconstructing light source 224 for providing to-be-modulated wave fronts which are made incident on the SLM 220. The light source 224 includes a highly coherent light emitting element and an optical system such as a collimator which is simple in construction, and provides wave fronts (plane wave, spherical wave, or the like) suitable for the application method of the actually used SLM.

The display controller 42 is connected to a light source driving circuit 226, SLM driving circuit 222 and buffer circuit 244. The display controller 42 effects the entire control operation of the display subunit 40 by controlling the light source via the light source driving circuit 226 and effecting the control so as to operate the scanner in synchronism with transfer of interference pattern data supplied from the gradation correcting unit 32 to the buffer circuit 244 and transferred to the SLM driving circuit 222.

Figure 15:
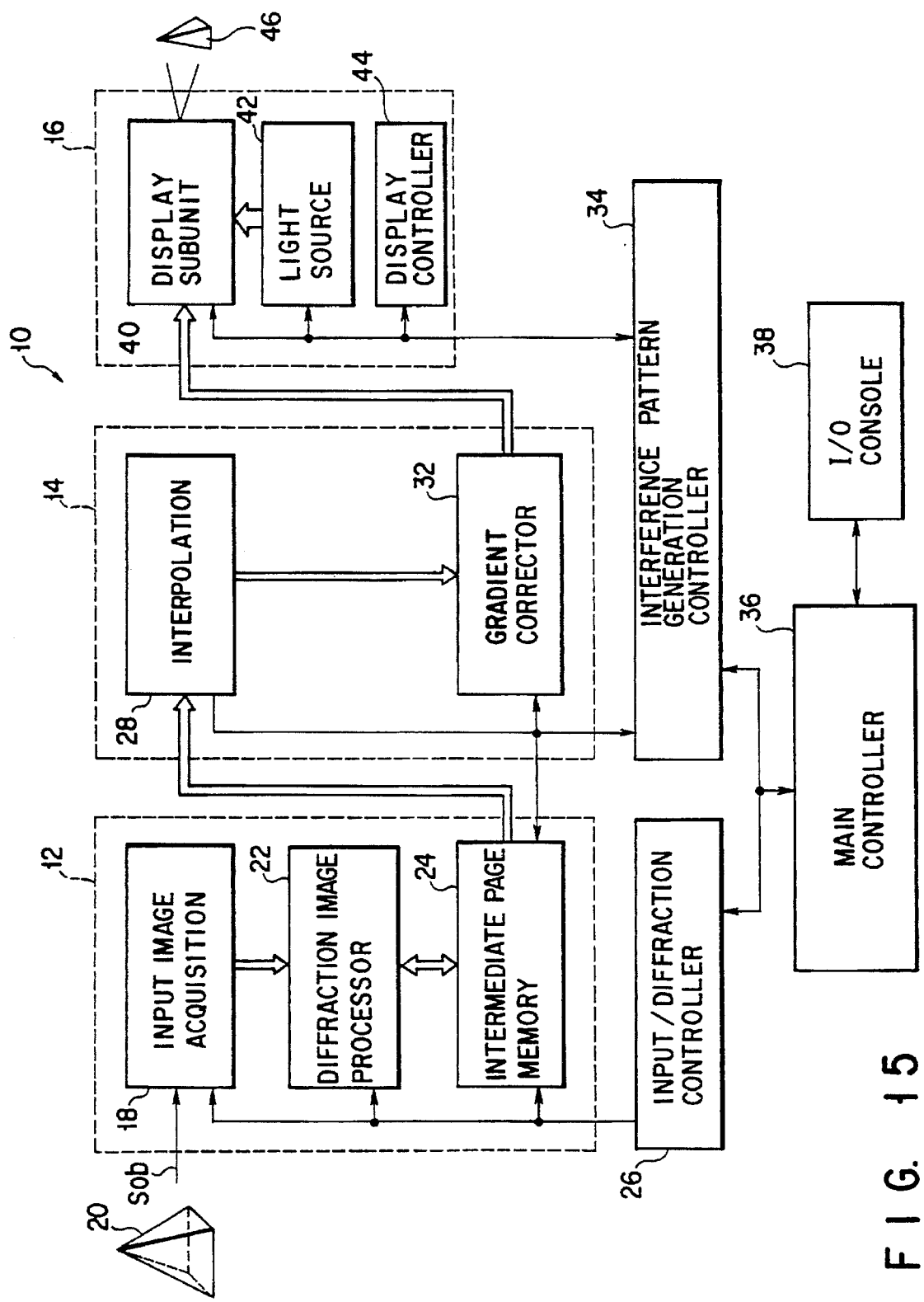
FIG. 15 is a block diagram schematically showing the whole construction of a computer-assisted holographic-display apparatus in accordance with another preferred embodiment of the present invention.

A computer-assisted holographic display apparatus according to another embodiment of the present invention is generally designated by a reference numeral "10" in FIG. 15. The holographic display apparatus 10 includes a diffraction image computing section 12, diffraction image interpolating section 14 and image display section 16. The diffraction image computing section 12 has a function of computing diffraction image (diffraction pattern) information data based on input sampling image data expressing the object of interest (20) among a hologram to be created. The diffraction image interpolating section 14 and image display section 16 enhance the sampling density of resultant diffraction data by effecting the interpolating process and forms wave fronts corresponding to the object of interest 20 on a previously selected holographic display device by use of the data. This embodiment is similar to the embodiment of FIG. 1 except that the computing process for forming interference pattern data in the diffraction image interpolating section is not effected and data of diffraction wave fronts is supplied to the image display section and the complex amplitude is directly reproduced. As the spatial light modulator 220 in the display subunit 40 used in this embodiment, any modulator for effecting the complex amplitude modulation explained in the above embodiment can be used.

A significant feature of the computer-assisted holographic-display apparatus 10 is as follows: the interpolating process is effected for the diffraction image pattern before a fringe-form interference pattern is derived from the diffraction image pattern created based on sampled input image data and having a relatively coarse sampling density. As a result, a diffraction image pattern having picture elements interpolated therein to have an increased sampling density as shown in FIG. 6 is created. Addition of the interpolating process makes it possible to enhance the computation efficiency of the diffraction image pattern forming process, which requires highly complicated processes to be repetitively effected and consequently requires a large-scale system construction (such as an internal memory of large capacity, high-performance computer, etc.). Enhancement of the computation efficiency can be attained without lowering the image quality of the hologram. This is because an increase in the sampling density by the interpolating process leads to a high resolution of the hologram interference pattern. In practice, in the embodiment described above, a fringe-form hologram interference pattern whose resolution is finally increased to approx. 1,000 to 2,000 dots per millimeter can be derived from sampled input image data Sob having a coarse sampling density of approx. 10 dots per millimeter. This ensures that a hologram of high quality can be produced while the system construction of the computer hologram recording apparatus 10 can be made simple and therefore this will prove a great boon to the hologram manufacturers.

Attention should be directed to the fact that it is not always necessary to use, as the intermediate memory 24, the one-page memory device having a storage capacity corresponding to one page. When what is called "virtual memory" architecture is employed, the intermediate page memory 24 may be replaced with a line-memory device of reduced capacity, which has two or more line memory sections. If a page memory is inherently provided in the image input section such as the input image acquisition section 18, or if full one-screen input image is supplied externally, a smooth shift to the next interpolation process may be achieved by computing an interference pattern corresponding to two lines and updating the resultant data in a one-by-one line manner. With such an arrangement, it is possible to attain an high-speed hologram computation while using a smaller storage capacity of intermediate memory.

Another significant feature of this embodiment is that the intermediate page memory 24 is provided between the diffraction image pattern processor 22 and the interpolating processor 28 being coupled to the interface pattern generator 30. The thus derived diffraction image pattern is stored into the intermediate page memory 24. Storage of the diffraction image pattern into the memory 24 permits a sequence of hologram processes from the process by the interference pattern generator 30 to the hologram recording operation by the scan printer 40 to adopt the automated pipeline structure. In other words, usage of the intermediate page memory 24 enhances the degree of matching between the operation efficiency of the diffraction pattern computation and the operation efficiency of a sequence of hologram processes set in a pipeline form at the succeeding stage. Therefore, the operation speed of the hologram recording operation can be further enhanced.

A further significant feature of this embodiment is that the computing section 56 of the diffraction image pattern processor 22 and the reference light wave generator 168 of the interference pattern generator 30 are constructed to adequately cope with various types of hologram recording operations required by the users by utilizing the general-purpose micro-processing units 64, 192 (see FIGS. 3 and 9). The condition of modification and/or computation of the processing algorithm can be relatively easily attained by modifying the contents stored in the PROMs 76, 202. This brings forth an expanded applicability that the hardware of one computer-assisted holographic-display apparatus 10 may be used to create all of various types of holograms.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, at the time of reduction of the present invention to practice, the input image storing page memory 52 of FIG. 2 for temporarily storing transferred sampling image data may not always be necessary. If the data transfer timing can be successfully set to correspond to the timing of the diffraction pattern computation operation, the input page memory 52 may be replaced by a known line memory or may be replaced by a buffer which is more simple in construction.

Further, the operation of the interpolation processing section 28 is not limited to the one-dimensional interpolation process explained with reference to FIG. 6. The simple linear interpolation and Lagrange interpolation can be utilized, but not only these methods but also the process of interpolating data can be utilized irrespective of the type thereof. Further, a case where the interpolation process is effected by use of two lines was explained, but if a larger number of lines are used, a more effective interpolation process can be attained although the construction may become somewhat complicated.

What is claimed is:

1. A computer-assisted holographic-display apparatus comprising:

first computation means for receiving an input image signal representing an object and for computing corresponding diffraction pattern data with a first sampling density;

second computation means coupled to said first computation means, for interpolating the diffraction pattern data to generate interpolated diffraction pattern data with an increased second sampling density;

third computation means coupled to said second computation means, for computing interference pattern data between the interpolated diffraction pattern data and reference wave data; and a display device connected to said third computation means, comprising, a light source of reproduction light, and means for modulating the reproduction light from said light source by use of the interference pattern data, thereby displaying a holographic image of the object.

2. The apparatus according to claim 1, wherein said reproduction light modulating means comprises light modulating means capable of forming an interference pattern by use of the interference pattern data and modulating light applied to the interference pattern.

3. The apparatus according to claim 1, further comprising:

storage means connected to the first and second computation means, for storing therein the diffraction pattern data with the diffraction pattern data being divided in a plurality of areas.

4. The apparatus according to claim 3, wherein said storage means comprises a page memory device.

5. The apparatus according to claim 4, wherein said page memory device has a memory space which permits adjacent ones of said plurality of areas having the diffraction pattern data stored therein to be overlapped at end portions thereof.

6. The apparatus according to claim 5, wherein said second computation means comprises:

interpolation processing means for having a plurality of channels, for effecting a predetermined type of interpolation process with respect to said plurality of areas in said page memory in a parallel manner.

7. The apparatus according to claim 6, wherein said first computation means comprises:

programmable memory means for modifiably storing an algorithm defining a method of computing said diffraction pattern data; and micro-processing unit means associated with said programmable memory means, for operating according to said algorithm.

8. The apparatus according to claim 6, wherein said third computation means comprises:

reference light wave generator means for generating reference light data representing a wavefront of a selected type of reference light; and means connected to said second computation means, for computing a fringe-shaped interference pattern data between the interpolated interference pattern data and the reference light data.

9. The apparatus according to claim 8, wherein said reference light wave generator means comprises:

programmable memory means for modifiably storing an algorithm defining a method of computing said interference pattern data; and micro-processing unit means associated with said programmable memory means, for operating according to said algorithm.

10. A computer-assisted holographic-display method comprising the steps of:

receiving an input image signal representing an object;

calculating a diffraction pattern data with a first sampling density corresponding to the received input image signal;

interpolating the diffraction pattern data to generate interpolated diffraction pattern data with an increased second sampling density;

providing reference wave data;

computing interference pattern data between the interpolated diffraction pattern data and reference wave data;

providing a reproduction light;

modulating the reproduction light by use of the interference pattern data, thereby displaying a holographic image of the object.

11. The method according to claim 10, wherein said modulating step comprises a substep of forming an interference pattern by use of the interference pattern data and modulating light applied to the interference pattern.

12. A computer-assisted holographic-display apparatus comprising:

first computation means for receiving an input image signal representing an object and for computing corresponding diffraction pattern data with a first sampling density;

second computation means coupled to said first computation means, for interpolating the diffraction pattern data to generate interpolated diffraction pattern data with an increased second sampling density; and modulated light forming means connected to said second computation means, for forming a holographic image of the object by use of the interpolated diffraction pattern data.

13. The apparatus according to claim 12, wherein said modulated light forming means comprises light modulating means for forming a modulation pattern modulating at least one of the amplitude and phase of light by use of the interpolated diffraction pattern data and modulating light applied to the modulation pattern.

14. The apparatus according to claim 12, wherein said modulated light forming means comprises means for applying to-be-modulated light to said light modulating means.

15. A computer-assisted holographic-display method comprising the steps of:

receiving an input image signal representing an object;

calculating a diffraction pattern data with a first sampling density corresponding to the received input image signal;

interpolating the diffraction pattern data to generate interpolated diffraction pattern data with an increased second sampling density; and modulating light by use of the interpolated diffraction pattern data to form a holographic image of the object.

16. The method according to claim 15, wherein said modulating step comprises a substep of forming a modulation pattern modulating at least one of the amplitude and phase of light by use of the interpolated diffraction pattern data to modulate light applied to the modulation pattern.

* * * * *